United States Patent [19]

Wendt et al.

[11] Patent Number: 5,343,134
[45] Date of Patent: Aug. 30, 1994

[54] METHOD FOR CHECKING BRAKE TORQUE

[75] Inventors: David C. Wendt, Hubertus; Robert J. Lapota, Greenfield; Karl T. Flierl, Port Washington, all of Wis.

[73] Assignee: Harnischfeger Corporation, Brookfield, Wis.

[21] Appl. No.: 55,744

[22] Filed: May 3, 1993

[51] Int. Cl.$^5$ .............................................. H02P 3/18
[52] U.S. Cl. ..................................... 318/757; 318/362
[58] Field of Search ................................. 318/362, 757

[56] References Cited

U.S. PATENT DOCUMENTS

| | | | |
|---|---|---|---|
| 4,953,053 | 8/1990 | Pratt | 361/31 |
| 4,965,847 | 10/1990 | Jurkowski et al. | 388/814 |
| 4,990,844 | 2/1991 | Gritter et al. | 318/757 |
| 4,994,725 | 2/1991 | Gschlössl | 318/757 |
| 4,996,470 | 2/1991 | Rowan et al. | 318/757 |
| 5,027,049 | 6/1991 | Pratt et al. | 318/807 |
| 5,061,883 | 10/1991 | Asano et al. | 318/362 |
| 5,077,508 | 12/1991 | Wycoff et al. | 318/436 |
| 5,115,176 | 5/1992 | White et al. | 318/362 |

OTHER PUBLICATIONS

Article Titled "Impulse ® Drives-Designed for User Safety" from Feb., 1992 issue of *Evolution Publication*.

*Primary Examiner*—William M. Shoop, Jr.
*Assistant Examiner*—Karen Masih
*Attorney, Agent, or Firm*—Jansson & Shupe, Ltd.

[57] ABSTRACT

In an AC inverter drive connected to an AC induction motor on a material handling machine, the motor (which has a load holding brake and a pulse-emitting shaft encoder) moves a load in hoisting or lowering directions. A method for checking brake load-holding torque including the steps of decelerating the motor toward zero speed, setting the brake, applying "float" load-holding electrical power to the motor, changing the current flowing to the motor and checking for motor rotation by pulse-counting. Motor power is blocked if the number of counted pulses is less than a predetermined number or is increased if the number of counted pulses is greater than a predetermined number, the latter indicating that the brake is incapable of holding the load.

17 Claims, 5 Drawing Sheets

METHOD FOR CHECKING BRAKE TORQUE

FIELD OF THE INVENTION

This invention relates to drive systems and, more particularly, to drive systems using electric motors.

BACKGROUND OF THE INVENTION

Electrical drive systems using electrical motors to power the end-use function are in wide use for propulsion, machine drives, conveyor lines, chemical processing, material handling applications and the like. A very small sampling of exemplary drive systems appears in U.S. Pat. Nos. 3,845,366 (Metzler et al.) and 4,177,238 (Binner).

Certain types of material handling machines incorporate electric motor drive systems for moving the machine from location to location, for moving a machine "substructure" on the machine itself and for moving loads of the type the machine is designed to handle. An example of such a material handling machine is an overhead travelling crane (OTC) used in factories, steel handling bays and the like for lifting, moving and placing loads.

Such a crane traverses along a pair of elevated main rails which are parallel and spaced apart, usually by several yards. A pair of crane bridge girders extends between the rails and there are driven wheels mounted at either end of the girders for supporting the crane atop the rails. And the girders themselves have rails on them.

A substructure called a "trolley" is mounted on the girder rails and traverses the width of the bridge under motive power. A load hoist is mounted on the trolley and includes a powered hoist/lower "rope drum" or drums about which steel cable is spirally wrapped. The cable is connected to a load-lifting hook, sling, bucket, magnet or the like. With the foregoing arrangement, the operator (who usually rides in a cab which is attached to and moves with the bridge) can pick up, move and place a load anywhere in the area travelled by the crane. Other, somewhat less common operating options include radio-controlled cranes operable from the ground or other remote location and operator cabs which are trolley, rather than bridge, mounted.

An exemplary overhead crane employs two electric-motor traverse drive systems, one each for the bridge and trolley traverse drives. A third electric-motor drive system is used for hoisting and lowering loads. Such drive systems may be powered by direct current (DC) or alternating current (AC). While DC drive systems were almost universally used in older steel mills and the like, AC variable frequency drive systems are becoming increasingly common, at least in part because of the advantages of precision control and design flexibility which they offer.

In a variable frequency drive system, motor speed is a function of the frequency of the electrical voltage applied to it. Examples of AC variable frequency drive systems (used for hoist drives) are described in U.S. Pat. Nos. 4,965,847 (Jurkowski et al.) and 5,077,508 (Wycoff et al.). The leading manufacturer of overhead cranes and AC drive systems therefor is Harnischfeger Industries, Inc. of Milwaukee, Wis. One such AC drive system is sold under the trademark SMARTORQUE ® and the invention involves a modification of a known type of SMARTORQUE ® controller.

Hoist, bridge and trolley drives are operated by an electrical controller coupled to an operator-manipulated master switch in the cab. Such master switch has a handle with a neutral position and a continuum of positions in each of two directions from neutral. The handle thus controls drive speed in either of two directions. And, subject to the limitation described below, the farther the handle is moved away from the neutral position, the faster the drive moves the load, e.g., the bridge or trolley or the load suspended from the hoist. And the counterpart is that as a master switch is moved toward its neutral position, the drive moves the load more slowly.

In either event, the electric motor and controller "ramp" the speed change so that such change occurs no more rapidly than the maximum predetermined rate set by the slope of the ramp. The quoted expression derives its name from the fact that when depicted on a two-axis graph, the lines representing rates of acceleration and deceleration are ramp-like in shape. Usually, the control manufacturer sets such rates—they are not changed in day-to-day crane operations.

Before setting forth additional background information, an understanding of some fundamentals will be helpful. One such fundamental relates to alternating current (AC) motors and to some of the operating characteristics of a particular type of AC motor, i.e., a squirrel cage motor. Another involves some operating principles of a type of motor controller known as an adjustable frequency inverter and the way such a controller is used with an AC squirrel cage motor. Yet another involves what is known as an asymmetrical load, i.e., a load which resists motor rotation in one direction and aids such rotation in the other, and how such a load affects the motor and the control scheme when a squirrel cage motor and adjustable frequency inverter are used to power the hoist drive.

A squirrel cage motor is so named because portions of its rotor (formed with parallel conductors shorted together at their ends) resembles a squirrel cage in shape. In three phase configuration (the type used on crane drives), the motor has only three stator terminals. In other words, there are no rotor terminals "brought out" as with a wound rotor motor.

Another fundamental relating to squirrel cage motors is that the rotational speed is, in general, a function of the frequency of the applied voltage. For example, a motor having a running speed at rated output torque and 60 Hz applied voltage of about 1760 RPM would have a running speed of about 860 RPM at 30 Hz applied voltage. In recognition of this characteristic of a squirrel cage motor, the above-noted SMARTORQUE ® AC drive system and other systems like it are called "inverters" and are configured to provide an output frequency (and voltage) which can be varied by changing the position of the master switch handle.

An electric motor drive system such as a crane hoist drive represents a somewhat unusual application. Unlike the bridge and trolley drives (and unlike many other types of drives not involving overhead travelling cranes), loads handled by the hoist drive are said to be asymmetrical. That is, the weight of the load either aids or resists motor rotation, depending upon the direction of load movement.

More specifically, when the load is being hoisted, the force of gravity resists such upward movement and thus resists motor rotation. On the other hand, when the load is being lowered, the force of gravity (acting, of course, in a downward direction) aids motor rotation and acts in a way to urge the motor to run faster. Loads of this type are sometimes referred to as "overhauling" loads.

A crane hoist drive is not the only type of drive called upon to handle asymmetrical loads. Any drive moving a load between two elevations, e.g., up and down a ramp or by a reversing, sloping conveyor represents such a drive.

U.S. Pat. Nos. 4,965,847 (Jurkowski et al.) and 5,077,508 (Wycoff et al.) depict examples of electric motor drive systems for use on overhead travelling cranes and, more specifically, for use on the hoist systems of such cranes. Such systems power the motor by maintaining a substantially constant ratio between the motor applied voltage and the frequency of such voltage. As a result, the motor has a substantially constant stator current and, consequently, exhibits substantially constant torque over its entire speed range.

In a crane hoist system, it is frequently required that the load be held suspended in mid-air while the crane travels to a different location. And such load holding is while the electrical hoist drive is off. Therefore, such systems are usually equipped with an electromagnetic clamping-shoe type brake which is released by energizing a large magnet coil on the brake. The brake shoes, which are spring-biased to a closed, "brake-on" position, clamp against a brake wheel when the magnet coil is de-energized. In crane hoist systems, the brake is sized and adjusted to provide braking or clamping torque on the order of about 150% of the rated output torque of the motor.

While systems of the foregoing type have been generally satisfactory, some are characterized by certain disadvantages. Electromagnetic brakes can and do fail, either partially or completely, often because of inadequate or improper maintenance. For example, the brake shoes may be permitted to wear unduly and the torque available from the brake is diminished, perhaps dramatically so. As another example, the brake may somehow become wedged open so that its shoes cannot clamp the brake wheel when the magnet coil is de-energized.

If the condition of the brake is such that it is inadequate to hold a suspended load, such load will descend, perhaps unexpectedly, when the hoist drive is turned off. That is, the operator will not be in control of such descending load and, unless alert for telltale signs of brake deficiency, may not be aware that the brake is other than fully operative. A method for checking brake load-holding torque which helps prevent uncontrolled load lowering would be an important advance in the art.

OBJECTS OF THE INVENTION

It is an object of the invention to provide a method for checking brake load-holding torque which overcomes some of the problems and shortcomings of the prior art.

Another object of the invention is to provide a method for checking brake load-holding torque which helps prevent uncontrolled load lowering.

Another object of the invention is to provide a method for checking brake load-holding torque which ascertains the integrity of the brake before disconnecting electrical power from the motor.

Still another object of the invention is to provide a method for checking brake load-holding torque which prevents further load hoisting until an apparently-defective brake is repaired.

Yet another object of the invention is to provide a method for checking brake load-holding torque which warns the operator that the brake integrity is suspect. How these and other objects are accomplished will become more apparent from the following descriptions and from the drawing.

SUMMARY OF THE INVENTION

The invention is an improvement in an AC inverter drive connected to an AC induction motor (preferably a squirrel cage motor) on a material handling machine. Such machine is of the type where the motor is equipped with a load holding brake which prevents the motor from rotating (and, therefore, prevents the load from moving) when the drive is off. The motor moves a load in hoisting or lowering directions rather than merely laterally.

A method for checking brake load-holding torque including the steps of decelerating the motor toward zero speed and setting the brake. Load-holding (or "load-float") electrical power is then applied to the motor in the hoisting or lowering direction and the current flowing to the motor is changed. A "check" is then made to determine whether or not the motor is rotating.

In a highly preferred method, the brake is set when the motor speed is within a range of speeds which includes zero speed, e.g., when the motor speed is between 10% of motor synchronous speed and zero speed. The motor has a load current for a particular load and the power-applying step includes flowing current to the motor at a value of between about 80% rated load current and about 100% rated load current. Since motor output torque is a function of motor current and since the motor may be lifting or lowering a load which is at or near the rated load for the machine, about 100% current is preferred. This is so in the unlikely event the brake exerts little or no loading-holding torque, the load will not be dropped.

For reasons mentioned below, it is preferred that the current changing step and the rotation checking step occur substantially simultaneously. And there are at least two ways to change current. The preferred way includes diminishing the current flowing to the motor. Current changing and rotation checking preferably occur simultaneously since diminishing current causes the motor to develop progressively less output torque. This puts progressively increasing reliance upon the ability of the brake to hold the load. If the brake is unable to hold the load for some reason, it is better to discern that fact while the motor is still exhibiting some degree of output torque.

The motor is equipped with a device known as a shaft encoder which emits pulses during motor rotation. The rotation checking step includes counting the number of pulses occurring during a predetermined time period. If the number of counted pulses is equal to or less than a predetermined number, the drive is "base blocked," i.e., power to the motor is blocked. On the other hand, if the number of counted pulses is greater than a predetermined number, the electrical power to the motor is increased so that it is again the motor, rather than the brake, which holds the load and prevents it from dropping.

One type of inverter drive includes what is referred to as a speed deviation system. The position of the machine operator's master switch provides a "command" signal which instructs the drive to provide an output voltage at a frequency which rotates the motor at a particular speed. The speed deviation system substantially continuously detects whether actual motor speed differs from the commanded motor speed by more than a predetermined amount. If it does so differ, the deviation system is configured to disable the drive.

However, in the event of an inoperative or improperly set brake, electrical power must be available to energize the motor and hold the load. Therefore, if electrical power is increased to the motor while carrying out the method (which occurs when the number of counted pulses from the encoder is greater than a predetermined number), the method includes the further step of disabling the speed deviation system so that the drive is not stopped as such system performs its normal function.

In another aspect of the invention, it is desirable to controllably lower the load to the floor if the brake is found to be faulty. To put it another way, load hoisting operations should be suspended pending brake repair. Thus, the preferred method also includes the further step of preventing the drive from powering the motor in the load-hoisting direction.

The machine operator, concentrating on the task at hand, may not immediately realize that something might be wrong with the brake. Therefore, the method includes the further step of annunciating a brake failure, by a panel warning light, by an audible signal or both. Of the disabling, preventing and annunciating steps mentioned above, the method may be carried out so that at least two such steps (and perhaps all three) occur substantially simultaneously. Or it may be carried out so that at least two such steps occur in sequence.

Earlier in this summary, it was mentioned that current changing could be carried out in one of at least two different ways. The first mentioned involves diminishing the current flowing to the motor. Another approach is to increase the current flowing to the motor to a value above load current. The effect of such current increase is to develop more motor torque (more than rated load torque) and, thus, try to "drive through" the brake while checking for pulses and pulse frequency from the encoder.

While this approach can be used with other method steps described above, it is more complex in implementation since it would likely require that current-limiting and time-limiting features be included in the drive. Motor current above rated current can raise the motor temperature, possibly to a motor-damaging level. And the higher the current, the exponentially shorter the time that such current can be tolerated before rated motor temperature is seriously exceeded.

As used in this specification, the term "motor speed" refers to the rotational speed of the motor rotor. The term "substantially simultaneously" means that with respect to the events being referred to, there is some common increment of time over which such events are occurring even though the events may not start and/or end at the same time. In other words, there is some time "overlap" in the events.

DETAILED DESCRIPTION OF THE PREFERRED EMBODIMENTS

Figure 1:
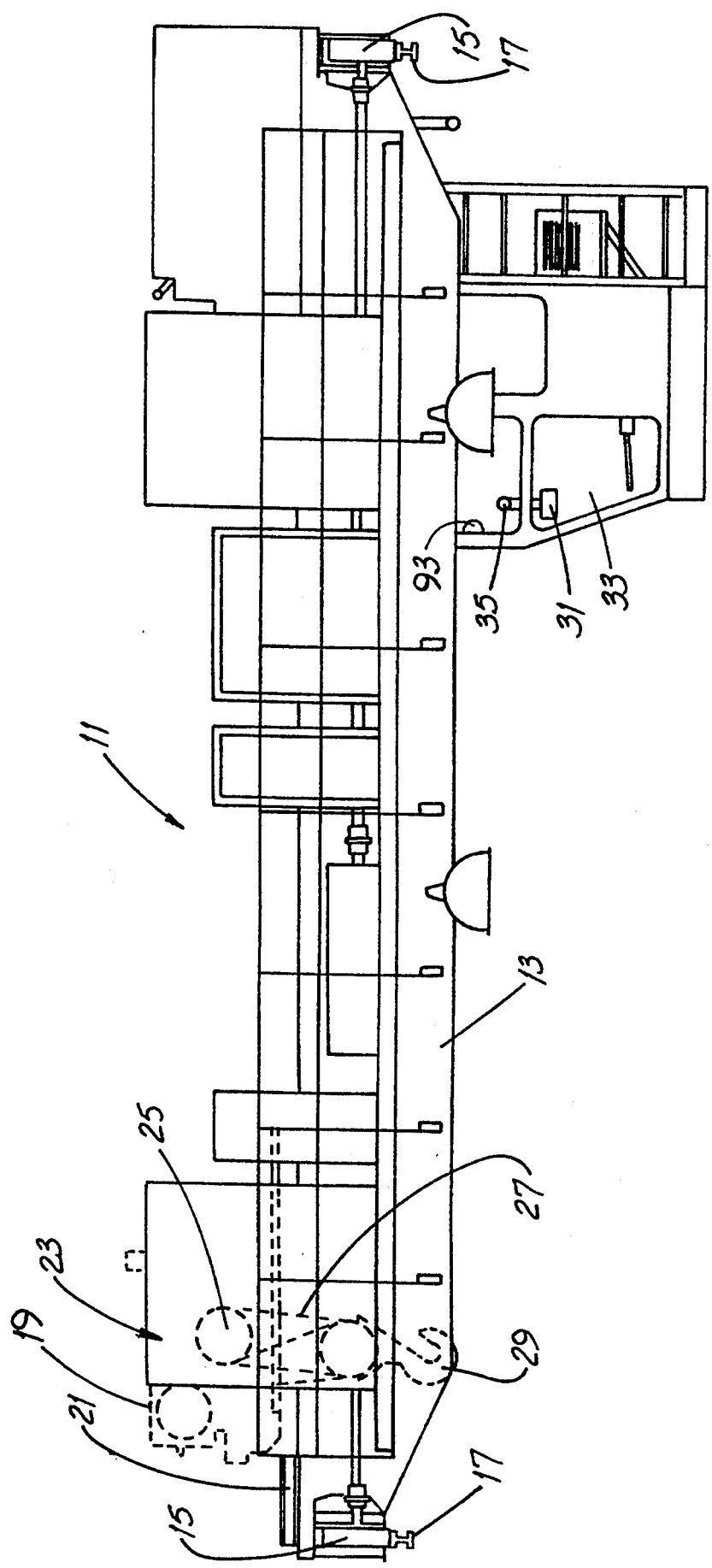
FIG. 1 is a representative side elevation view of an exemplary material handling machine embodied as an overhead travelling crane.
Figure 2:
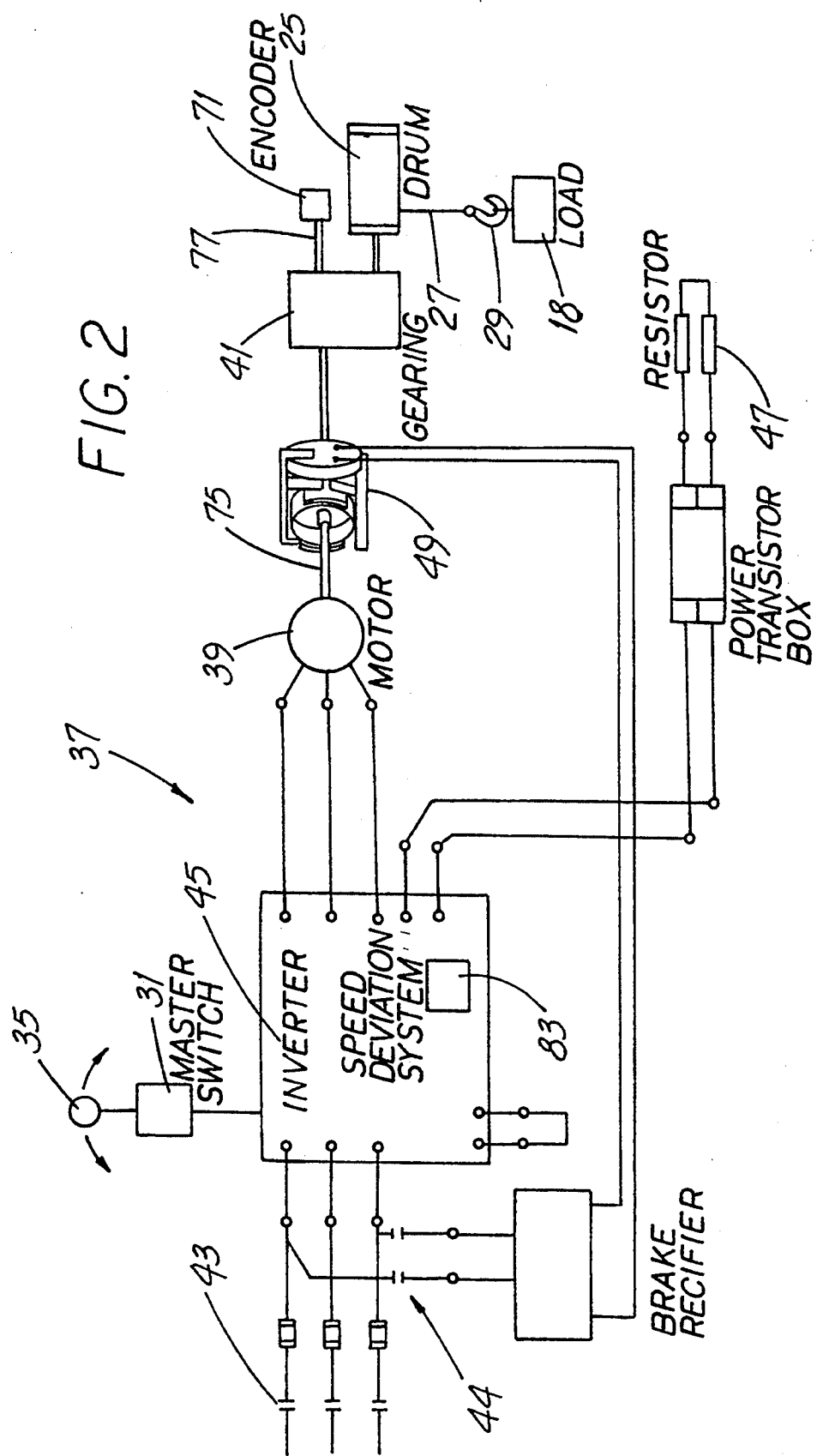
FIG. 2 is a simplified circuit diagram of the hoist drive of the crane of FIG. 1.

Before describing the inventive method, it will be helpful to have a more detailed understanding of one type of application with which the method is used. Referring to FIGS. 1 and 2, an overhead travelling crane 11 includes a pair of spaced-apart bridge girders 13 supported at either end by railway-like flanged wheels 15. The wheels 15 ride on rails 17 which, in three dimension, would extend into and out of the drawing sheet. Such rails 17 and, indeed, the entire crane 11 are well above the level of the surface, e.g., the floor, on which rests a load 18 to be moved by the crane 11.

Mounted atop the girders is a trolley 19, itself supported on similar wheels riding rails 21 extending the length of the bridge girders 13. The trolley 19 is equipped with a hoist mechanism 23 comprising a cylinder-like drum 25 having steel cable 27 wrapped around it. Suspended from the cable 27 is a device for lifting a load 18. While a hook 29 is illustrated, such device may take the form of a sling, an electromagnet or other device. As the drum 25 is rotated by the hoist motor, the hook 29 (and any load 18 attached to the hook) raises or lowers.

Drum rotation (both direction and speed) is controlled by an operator manipulating a master switch 31 in the crane cab 33. When the operator moves the master switch handle 35 in one direction, e.g., "raise" or the other, e.g., "lower", from a neutral or "off" position, the drum 25 rotates accordingly. And the distance the handle 35 is moved from the neutral position controls the speed of rotation.

FIG. 2 illustrates a representative three-phase AC adjustable frequency inverter drive 37 for controlling the squirrel cage hoist motor 39. Such motor is coupled to the hoist drum 25 through appropriate gearing 41. The drive 37 includes a main line contactor 43, an adjustable frequency inverter 45 and a set of dynamic braking resistors 47. Whenever the hoist 37 drive is shut off, an electromagnetic shoe brake 49 clamps the brake wheel and holds the motor and hoist drum 25 in a fixed position, even though a load may be suspended from the hook 29. When the drive 37 is turned on for motor rotation, a brake contactor 44 closes and energizes the brake magnet coil to open the brake 49. As shown in FIG. 2, the wheel of the brake 49 is coupled to the motor 39 by a shaft 75.

A pulse-emitting encoder 71 is coupled to sense motor speed. With a double ended motor 39 (a type in which the motor shaft protrudes from both motor ends), the encoder 71 can be coupled to that shaft end not used to drive the drum 25. Or the encoder 71 can be coupled to the high speed gearing shaft 77 as shown. The encoder 71 emits a predetermined number of pulses for each revolution and preferably, such number is quite large, i.e., on the order of 1024 pulses per revolution. By counting the number of pulses per unit time, motor speed can be computed.

Figure 3:
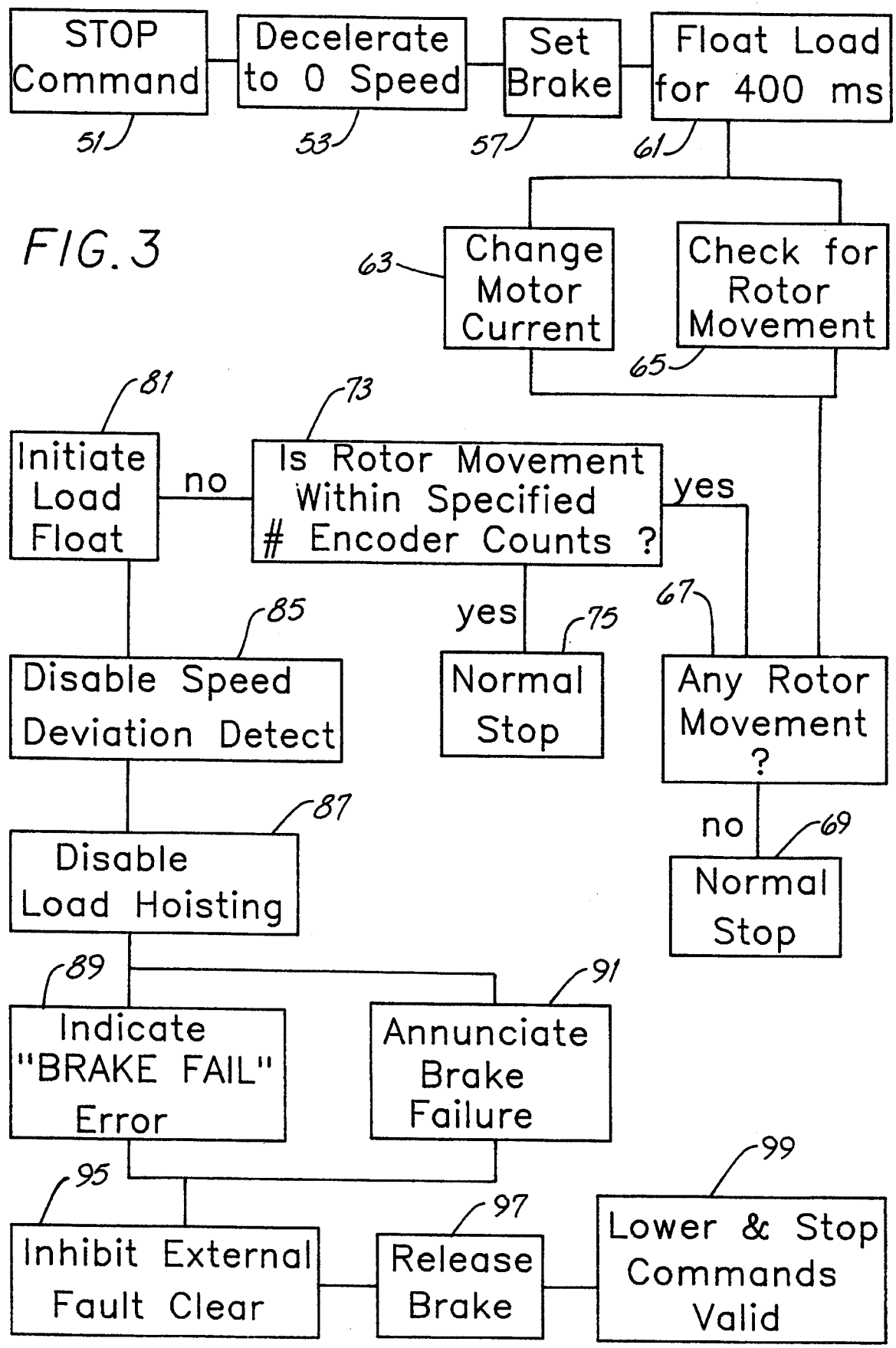
FIG. 3 is a block diagram flow chart depicting aspects of the inventive method.

Referring also to FIG. 3, aspects of the new method will now be set forth. It is assumed that the crane operator has a load 18 attached to the hook 29 and is hoisting the load 18 from the floor in preparation for holding it at a suspended position and, while suspended, carrying such load 18 to another location. For clarity in the following description, aspects of the method and the representative symbol are identified by a common numeral.

To hold the raised load 18 in the suspended position, the operator moves the master switch handle 35 to the "off" or neutral position and this results in a "stop command" 51. Such command 51 causes the motor 39 to decelerate toward zero speed, symbol 53. Deceleration is by "ramping down" the frequency of the voltage applied to the motor 39 as represented by the motor speed plot 55 in FIG. 5B. Thereupon, the brake 49 is set as indicated by the symbol 57. Brake setting occurs when motor speed decreases to within a few percent of zero speed.

Figure 5A:
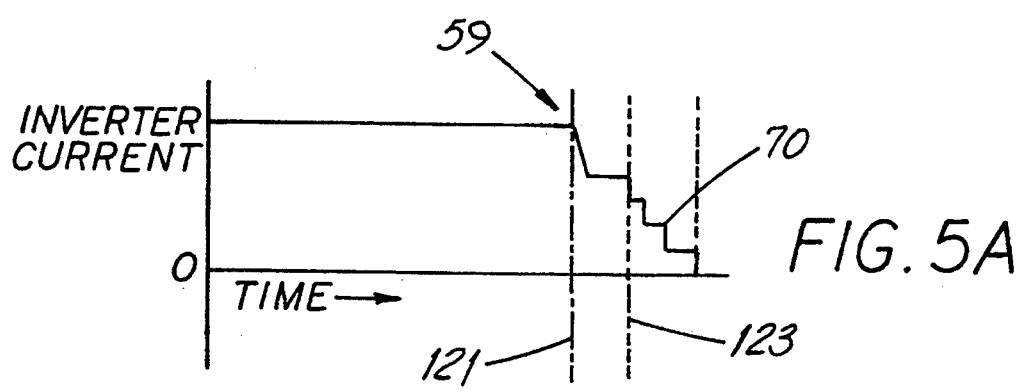
FIG. 5A is a graph of inverter current as a function of time and illustrates aspects of the method.
Figure 5B:
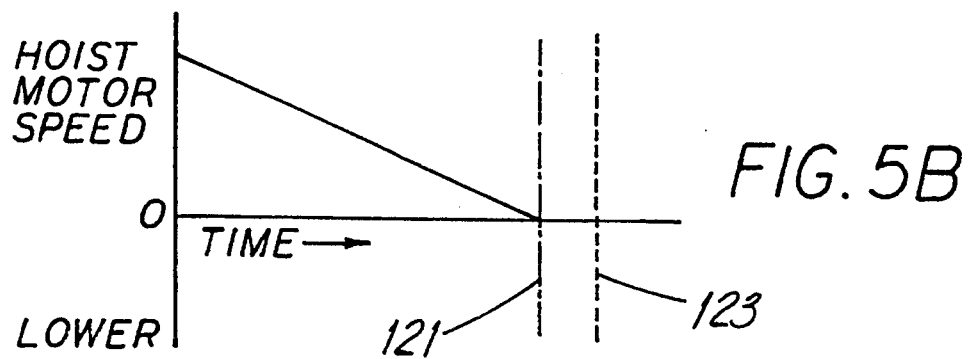
FIG. 5B is a graph of motor speed as a function of time and illustrates other aspects of the method. The graphs of FIGS. 5A and 5B are plotted to the same time line.

In FIG. 5A, the horizontal line between the zero axis and line 121 represents decelerating current while the horizontal line between lines 121 and 123 represents load current. As shown at location 59 in the representative motor/inverter current plot in FIG. 5A, load-holding (or "load-float") electrical power is applied to the motor 39 in the hoisting direction, symbol 61, for a predetermined time to allow the brake 49 to set and then current flowing to the motor is changed, symbol 63. Symbol 65 represents a "check" which is made to determine whether or not the motor 39 is rotating.

In a highly preferred method, the brake 49 is set when the motor speed is within a range of speeds which includes zero speed, e.g., when the motor speed is between 10% of motor synchronous speed and zero speed. The motor has a load current (that which is required to hold the load) and the power-applying step includes flowing current to the motor 39 at a value of current about equal to the current required to produce torque sufficient to hold the load. Since motor output torque is a function of motor current and since the motor 39 may be handling a load which is between zero and the rated load for the crane 11 or other machine, only load current is needed. This is so that in the unlikely event the brake 49 exerts little or no loading-holding torque, the load 18 will not be dropped.

For reasons mentioned below, it is preferred that the current changing step 63 and the rotation checking step 65 occur substantially simultaneously. And there are at least two ways to change current. The preferred way includes diminishing the current flowing to the motor 39. Current changing and rotation checking preferably occur simultaneously since diminishing current causes the motor 39 to develop progressively less output torque. This puts progressively increasing reliance upon the ability of the brake 49 to hold the load 18. If the brake 49 is unable to hold 18 the load for some reason, it is better to discern that fact while the motor 39 is still exhibiting some degree of output torque.

Most preferably, motor current (which relates to output torque) is reduced in increments with rotation checking 65 following or accompanying each such reduction. Reductions in increments of 5-30% are preferred and, most preferably, in increments of about 25%, i.e., from 100% to 75%, 50%, 25% and 0% as shown at location 70 in FIG. 5A.

The shaft encoder 71 emits pulses during any motor rotation and the rotation checking step, symbol 65, includes detecting whether there are any pulses during a predetermined time period, symbol 67. If not, the drive is stopped normally, symbol 69.

If there are such pulses, the number thereof during such time period is counted, symbol 73. If the number of counted pulses is equal to or less than a predetermined number, the drive is stopped normally as indicated by symbol 75.

Preferably, the maximum number of counted pulses is not in excess of 50 pulses and in a highly preferred method, such number is about 5 to 10 pulses. The predetermined time period is preferably no more than about one second and, most preferably, is about 300–400 milliseconds. On the other hand, if the number of counted pulses is greater than the predetermined number, e.g., 5 pulses, the electrical power to the motor 39 is increased to "float" the load (symbol 81) so that it is again the motor 39, rather than the brake 49, which holds the load 18 and prevents it from lowering.

One type of inverter drive 37 includes what is referred to as a speed deviation system 83. The position of the machine operator's master switch handle 35 provides a "command" signal which instructs the drive 37 to provide an output voltage at a frequency which rotates the motor 39 at a particular speed. The speed deviation system 83 substantially continuously detects whether actual motor speed differs from the commanded motor speed by more than a predetermined amount. If it does so differ, the deviation system 83 is configured to disable the drive 37.

However, in the event of an inoperative or improperly set brake 49, electrical power must be available to energize the motor 39, hold the load 18 and lower such load 18 under power. Therefore, if electrical power is increased to the motor 39 while carrying out the method (which occurs when the number of counted pulses from the encoder 71 and within a particular time is greater than a predetermined number), the method includes the further step of disabling the speed deviation system 83, symbol 85, so that the output motor current of drive 37 is not stopped as it otherwise would be if such system 83 were permitted to perform its normal function.

In another aspect of the invention, it is desirable to controllably lower the load 18 to the floor if the brake 49 is found to be faulty. To put it another way, load hoisting operations should be discontinued or disabled pending brake repair. Thus, the preferred method also includes the further step of disabling the drive 37 in the hoisting direction, symbol 87.

The machine operator, concentrating on the task at hand, may not immediately realize that something might be wrong with the brake 49. Therefore, the method includes the further steps of indicating a "brake fail" error (symbol 89) and annunciating a brake failure (symbol 91), by a panel warning light 93, by an audible signal or both. Of the disabling, preventing and annunciating steps mentioned above, the method may be carried out so that at least two such steps (and perhaps all three) occur substantially simultaneously. Or it may be carried out so that at least two such steps occur in sequence.

The ability to clear the indicated "fault" (occurring in the form of the annunciated brake failure), is inhibited, symbol 95, so that the operator cannot make the indicated fault "go away." The brake is released, symbol 97, and by retaining the ability to lower the load 18 and stop it in the lowering direction, symbol 99, the operator may lower the load 18 to the floor.

Earlier in this summary, it was mentioned that current changing could be carried out in one of at least two different ways. The first mentioned involves diminishing the current, preferably in increments, flowing to the motor 39 and placing progressively greater reliance upon the load-holding ability of the brake 49 as a way to test brake integrity. Another approach is to increase the current flowing to the motor 39 to a value above rated current. The effect of such current increase is to develop more motor torque (more than rated torque) and, thus, try to "drive through" the brake while checking for pulses and pulse frequency from the encoder. Brakes are typically sized and set to provide braking torque significantly in excess of full load motor torque. Therefore, if at, say, 110% output torque, the motor 39 is able to drive through the brake 49, this may be an indication that such brake is not properly set.

Figure 4:
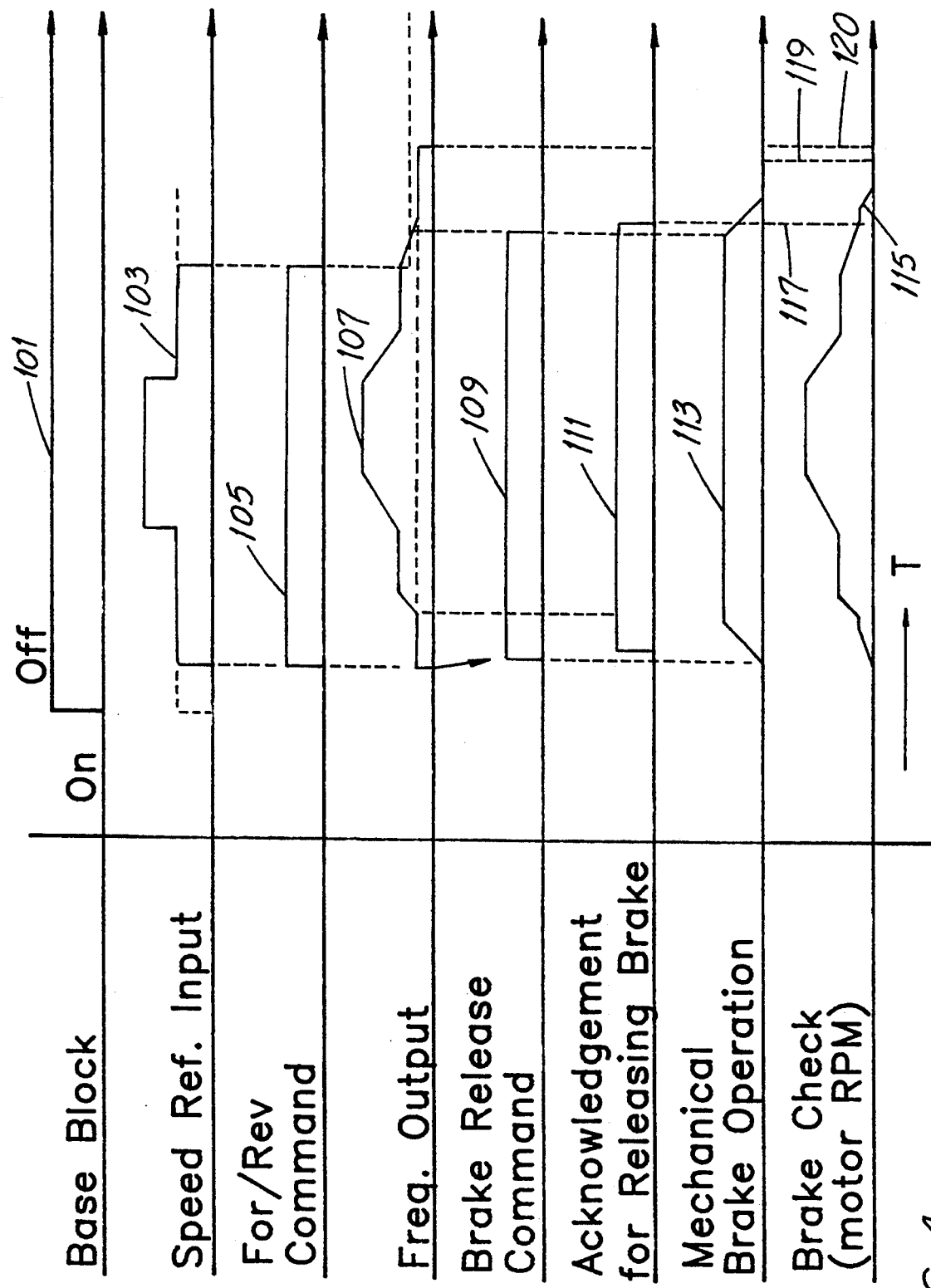
FIG. 4 is a graph depicting various output signals of the hoist drive inverter as a function of time.

Referring also to FIG. 4, the line 101 represents "activation" of the drive 37 by closing the contactor 43. The trace 103 represents a changing speed command from the master switch 31 and the line 105 represents a directional command, i.e., forward (hoisting) or reverse (lowering). Such directional command results when the handle 35 of the master switch 31 is pulled toward the operator (hoisting) or pushed away from the operator (lowering). Trace 107 represents the frequency output command and is a function of the distance (as measured along an arc) from which the handle 35 is moved from its center position. The greater the distance such handle 35 is moved from its center or neutral position, the higher the commanded frequency and, therefore, the greater the speed of the motor 39.

Line 109 represents the command to release the brake 49 by closing brake contactor 44 and line 111 represents an "answer back" acknowledging such command. Trace 113 represents operation of the brake 49 and trace 115 represents load stabilization. The time interval between dashed lines 117, 119 represents 300-400 milliseconds generally corresponding to the load float symbol 61. Similarly, the time interval between lines 121, 123 in FIGS. 5A and 5B also represents such 300-400 millisecond time period.

The time represented by the space between lines 119 and 120 in FIG. 4 is that time during which brake holding capability is checked by reducing motor current in "steps" as shown at location 70 in FIG. 5A and by checking for any motor rotation as described above. If no rotation occurs, the frequency output (as represented by trace 107) is turned off. On the other hand, if motor rotation is detected, the frequency output is maintained on and load torque is maintained.

The principles of the invention have been described in connection with a few preferred embodiments. However, it should be understood clearly that such embodiments are exemplary and that the invention is susceptible to variations without departing therefrom.

We claim:

1. A method for checking brake torque in an AC inverter drive connected to an AC induction motor for moving a load in hoisting or lowering directions, the motor being equipped with a spring-set load brake, the method including the steps of:
    decelerating the motor toward zero speed;
    setting the brake;
    applying full wave electrical power to the motor at a power level sufficient to prevent the load from lowering;
    changing current flowing to the motor by changing the magnitude of the voltage applied to the motor; and
    checking for motor rotation.

2. The method of claim 1 wherein the brake is set when the motor speed is within a range of speeds which includes zero speed.

3. The method of claim 2 wherein the range of speeds is between zero speed and less than 10% of motor synchronous speed.

4. The method of claim 1 wherein the motor has a load current and the power-applying step includes flowing current to the motor at a value of between about 80% load current and about 100% load current.

5. The method of claim 1 wherein the current changing step and the rotation checking step occur substantially simultaneously.

6. The method of claim 5 wherein the current changing step includes diminishing the current flowing to the motor.

7. The method of claim 6 wherein the motor is equipped with a shaft encoder emitting pulses during motor rotation and the rotation checking step includes:
    counting the number of pulses occurring during a predetermined time period;
and the method includes, in the alternative, the further step of either:
    blocking power to the motor if the number of counted pulses is equal to or less than a predetermined number; or:
    increasing the electrical power to the motor if the number of counted pulses is greater than a predetermined number.

8. The method of claim 7 wherein the drive includes a speed deviation system for disabling the drive in the event actual motor speed differs from commanded motor speed by more than a predetermined amount and, if electrical power is increased to the motor, the method includes the further step of disabling the speed deviation system.

9. The method of claim 8 including the further step of preventing the drive from powering the motor in the load-hoisting direction.

10. The method of claim 9 including the further step of annunciating a brake failure.

11. The method of claim 10 wherein, of the disabling, preventing and annunciating steps, at least two such steps occur substantially simultaneously.

12. The method of claim 10 wherein, of the disabling, preventing and annunciating steps, at least two such steps occur in sequence.

13. The method of claim 5 wherein the current changing step includes increasing the current flowing to the motor to a value above rated current.

14. The method of claim 13 wherein the motor is equipped with a shaft encoder emitting pulses during motor rotation and the rotation checking step includes:
    counting the number of pulses occurring during a predetermined time period;
and the method includes, in the alternative, the further step of either:
    blocking power to the motor if the number of counted pulses is equal to or less than a predetermined number; or:

increasing the electrical power to the motor if the number of counted pulses is greater than a predetermined number.

15. The method of claim 14 including the further step of preventing the drive from powering the motor in the load-hoisting direction.

16. The method of claim 1 wherein the current changing step includes reducing motor current in stepped increments below full load motor current.

17. The method of claim 16 wherein each reduction in motor current is accompanied by checking for rotor movement.

* * * * *